(12) United States Patent
Sonnenberg (10) Patent No.: US 10,830,620 B2
(45) Date of Patent: Nov. 10, 2020

(54) ULTRASONIC METER HAVING A PLURALITY OF PROJECTIONS OF DIFFERENT HEIGHTS IN A SECTION OF AN INNER WALL OF A MEASURING TUBE OR AT LEAST ONE BYPASS

(71) Applicant: DIEHL METERING GMBH, Ansbach (DE)

(72) Inventor: Hans-Michael Sonnenberg, Neuendettelsau (DE)

(73) Assignee: Diehl Metering GmbH, Ansbach (DE)

( * ) Notice: Subject to any disclaimer, the term of this patent is extended or adjusted under 35 U.S.C. 154(b) by 0 days.

(21) Appl. No.: 16/508,725

(22) Filed: Jul. 11, 2019

(65) Prior Publication Data

US 2020/0033169 A1    Jan. 30, 2020

(30) Foreign Application Priority Data

Jul. 25, 2018 (DE) .......................... 10 2018 005 845

(51) Int. Cl.
  *G01F 1/66* (2006.01)
  *G01F 15/18* (2006.01)

(52) U.S. Cl.
  CPC .............. *G01F 1/667* (2013.01); *G01F 1/662* (2013.01); *G01F 15/18* (2013.01)

(58) Field of Classification Search
  None
  See application file for complete search history.

(56) References Cited

U.S. PATENT DOCUMENTS

| 2018/0010940 | A1 | 1/2018 | Sonnenberg |
| 2018/0120139 | A1 | 5/2018 | Sonnenberg |
| 2018/0136024 | A1 | 5/2018 | Sonnenberg |

FOREIGN PATENT DOCUMENTS

| DE | 102016008302 A1 | 1/2018 |
| DE | 102016013607 A1 | 5/2018 |
| EP | 1701140 A1 | 9/2006 |

*Primary Examiner* — Harshad R Patel
(74) *Attorney, Agent, or Firm* — Laurence A. Greenberg; Werner H. Stemer; Ralph E. Locher (57) ABSTRACT

An ultrasonic meter for recording a flow rate of a fluid includes a fluid inlet, a fluid outlet and a flow channel which connects the fluid inlet to the fluid outlet and includes a measuring tube extending in a straight line in a flow direction. The measuring tube has a plurality of projections formed on an inner wall of a side wall of the measuring tube for delimiting a flow cross section of the measuring tube. The projections extend over at least a section of the length of the measuring tube in the flow direction and extend with a predetermined projection height at an angle, in particular perpendicularly, to the side wall. At least two of the projections have mutually different projection heights and/or the flow channel includes at least one bypass for diverting a part of a fluid flowing through the flow channel past the measuring tube.

18 Claims, 6 Drawing Sheets

FIG. 12

ULTRASONIC METER HAVING A PLURALITY OF PROJECTIONS OF DIFFERENT HEIGHTS IN A SECTION OF AN INNER WALL OF A MEASURING TUBE OR AT LEAST ONE BYPASS

CROSS-REFERENCE TO RELATED APPLICATION

This application claims the priority, under 35 U.S.C. § 119, of German Patent Application DE 10 2018 005 845.0, filed Jul. 25, 2018; the prior application is herewith incorporated by reference in its entirety.

BACKGROUND OF THE INVENTION

Field of the Invention

The invention relates to an ultrasonic meter for recording a flow rate of a fluid, including a fluid inlet, a fluid outlet and a flow channel connecting the fluid inlet to the fluid outlet, the flow channel has a measuring tube which extends in a straight line in a flow direction, the measuring tube has a plurality of projections which are formed on an inner wall of a side wall of the measuring tube, which delimit the flow cross section of the measuring tube, which extend over at least a section of the length of the measuring tube in the flow direction and which extend with a predetermined projection height at an angle, in particular perpendicularly, to the side wall.

One possibility for measuring a flow through a measuring tube involves ultrasonic meters. In those meters, an ultrasound transducer is used in order to introduce an ultrasound wave into a fluid flowing through the measuring tube. The wave is conducted on a straight path or after multiple reflections at walls or special reflection elements to a second ultrasound transducer. A flow velocity through the measuring tube can be determined from the time of flight of the ultrasound wave between the ultrasound transducers, or from a time-of-flight difference in the event of interchanging of the transmitter and receiver, and therefore a flow rate can be determined for a known tubular cross section.

One important challenge in the construction of such an ultrasonic meter is to achieve a measurement accuracy which is as high as possible over a wide measurement range. Typically, the measured time of flight has a time-of-flight-independent error, the effect of which is that a relative error of the measurement accuracy increases with a decreasing flow velocity. One possibility of compensating therefor is to use smaller measuring tube cross sections. That, however, leads to the ultrasonic meter overall having a high flow resistance, which is disadvantageous in the case of large throughputs. A further restriction of the usable measurement range is that, with particular flow velocities, for example because of stagnation at the reflection elements, sudden and under certain circumstances hysteretic changes may occur in the flow profile. If such flow changes occur in the case of a particular flow velocity, the ultrasonic meter can only be used with high accuracy exclusively below or only exclusively above that particular flow velocity.

German Patent Application DE 10 2016 008 302 A1, corresponding to U.S. Patent Application Publication No. 2008/0010940, discloses a use of measuring tubes with an undulating internal surface. The undulation of the side wall breaks a rotational symmetry of the flow, which can contribute to suppressing sudden changes of the flow conveyance. If such ultrasonic meters are to be used over a large dynamic range of flow rates, however, a measuring tube with a relatively large external diameter is required in order to avoid an excessively large increase in the flow resistance. At the same time, however, housing openings of an ultrasonic meter in the inlet or outlet region should not exceed particular cross sections.

SUMMARY OF THE INVENTION

It is accordingly an object of the invention to provide an ultrasonic meter, which overcomes the hereinafore-mentioned disadvantages of the heretofore-known meters of this general type and which, with the same overall size, in particular has a lower flow resistance and/or a higher measurement dynamic range and/or can be produced more compactly.

With the foregoing and other objects in view there is provided, in accordance with the invention, an ultrasonic meter for recording a flow rate of a fluid, comprising a fluid inlet, a fluid outlet and a flow channel connecting the fluid inlet to the fluid outlet, the flow channel including a measuring tube which extends in a straight line in a flow direction, the measuring tube includes a plurality of projections which are formed on an inner wall of a side wall of the measuring tube, which delimit the flow cross section of the measuring tube and which extend over at least a section of the length of the measuring tube in the flow direction and extend with a predetermined projection height at an angle, in particular perpendicularly, to the side wall, and at least two of the projections have different projection heights from one another, and/or the flow channel includes at least one bypass through which a part of a fluid flowing through the flow channel can be diverted past the measuring tube.

The invention is based on the concept of providing flow paths, or sections of the flow cross section, of differing extent for the fluid, which differ particularly in relation to the flow velocity, and in which a change between laminar and turbulent flow takes place. If at least one bypass is used, the flow in the bypass, or in a plurality of bypass channels which form this bypass, may for example initially remain laminar, whereas the flow in the measuring tube, or at least in the central region of the measuring tube which is relevant for the measurement, is already turbulent. The effect of using projections with different heights, as will be explained in more detail below, is that a transition between the laminar and the turbulent flow takes place at very different flow velocities in different subsections of the flow cross section. So long as the flow remains laminar, in near-wall regions, i.e. in particular close to the side wall of the measuring tube and/or in the bypass, or at least in sections of the bypass, this results in a relatively low flow velocity since the fluid is slowed by the strong interaction with the wall. If the flow rate through the flow channel is then increased, the flow velocity in these regions increases to a disproportionate extent because of a transition to turbulent flow, so that conversely the flow velocity in the central region of the measuring tube, which is relevant for the measurement, changes less greatly than would be the case with an equal flow behavior in all regions.

In other words, the ultrasonic meter may be configured in such a way that the bypass, or the regions of the flow cross section which lie between the projections, contribute only slightly to the fluid transport at low flow velocities, whereas at high flow velocities they make a much larger percentage contribution to the flow transport. In the case of high throughputs, the flow resistance of the ultrasonic meter is thus kept below, whereas in the case of low flow rates sufficient flow velocities are still achieved in the central region of the measuring tube, in order to permit sufficiently accurate measurements. In the scope of the invention, it has been discovered that corresponding effects also occur with relatively simple structures, for example in the case of the measuring tube discussed in the introduction with a uniformly undulating wall. Through the use according to the invention of at least two different projection heights or of an additional bypass, however, on one hand the dynamic range recordable with high accuracy is increased significantly and, on the other hand, the effect is achieved that the change from laminar to turbulent flow takes place in a plurality of substeps, so that sudden changes in the flow behavior, which can potentially reduce the measurement accuracy, can be avoided.

The measuring tube may be fitted into an outer tube which forms the flow channel at least in sections. It may preferably extend between a first and a second ultrasound transducer, or between reflection elements assigned thereto for guiding ultrasound through the measuring tube.

In the ultrasonic meter according to the invention, at least four projections are preferably used, which have at least two mutually different projection heights. The projections may, in particular, be formed as webs which, in the circumferential direction of the measuring tube, have an extent which is significantly smaller, for example smaller by a factor of 3 or 5 or 10 or 20, than the respective projection height.

The bypass may be formed at least in part by a plurality of bypass channels disposed in the circumferential direction around the measuring tube. The measuring tube may have a smaller flow cross section then sections of the flow channel which lie before and/or behind the measuring tube in the flow direction. This results in a higher flow velocity in the measurement region, and therefore potentially an improved measurement accuracy. The projections preferably extend over the entire length of the measuring tube.

Preferably, the measuring tube includes a plurality of first projections, the projection height of which is greater than or equal to a limiting projection height, and a plurality of second projections, the projection height of which is less than the limiting projection height, with at least one, preferably at least two, second projections respectively being formed in the circumferential direction of the measuring tube between two first projections formed on the inner wall. In particular, all of the first projections may have substantially the same projection height and/or all of the second projections may have substantially the same projection height. The projection height of all of the first projections or of the lowest of the first projections may be at least 10%, 20% or 30% greater than the projection height of all of the second projections, or of the highest of the second projections. The projections may be distributed uniformly with an angular spacing of for example 30° in the circumferential direction, with every fourth of the projections being a first projection. It is thus, for example, possible to provide three first projections, and three second projections may be respectively disposed between two first projections in the circumferential direction. It is, however, also possible for two, four or more second projections to be disposed between two first projections. It is also possible to provide two, four or more first projections.

The first projections may extend, for example radially, in the direction of an inner core region of the flow cross section. The core region may be used as a measurement region, through which substantially the propagation path of the ultrasound radiation relevant in terms of measurement technology extends. Since only the relatively narrow end surfaces of the first projections are relevant as delimiting side wall sections in this region, even with low throughputs the flow can change from laminar to turbulent flow, whereas in one or more intermediate regions which are delimited by the side wall surfaces of the first projections and the end surfaces of the second projections, turbulent flows cannot yet occur. It is only with a higher throughput that the flow can substantially become turbulent in the intermediate regions. In edge regions of the flow cross section, which are delimited by the side surfaces of the second projections and the inner wall of the measuring tube, the flow remains laminar for the longest because of the small wall spacings. As an alternative or in addition to providing edge regions by the different projection heights, regions of the flow cross section in which the flow remains laminar even with relatively high throughputs may also be provided by bypass channels. In this case, the flow cross sections or the maximum wall spacings of the fluid in the bypass channels may be so small that the flow in the bypass channels can become turbulent only with high throughputs.

It is also possible that further projections, in particular with a different projection height, are additionally provided, which in turn define a cross subsection of the flow cross section, which has different geometrical dimensions than the bypass channels, or the further cross subsections of the flow cross section, so that in this cross subsection, or in these cross subsections, the change between laminar flow and turbulent flow, and vice versa, takes place with different throughputs than in the bypasses or the other cross subsections.

Due to a corresponding configuration of the measuring tube, it is therefore possible to achieve the effect that, with a relatively small throughput volume, a large part of the fluid transport takes place in the measurement region since the maximum flow velocity is achieved there. With relatively low throughputs, the flow is turbulent exclusively in the measurement region. With an increasing throughput volume, first the intermediate region and subsequently the edge region, or the bypass channels, change to turbulent flow so that a larger part of the fluid transport can take place in these regions. The effect of this is that the flow velocity in the measurement region, and therefore also the measurement effect measured during a time-of-flight measurement, is not related linearly to the flow rate, but rather the gradient of the quantities mentioned decreases with an increasing throughput. This makes it possible that a high measurement accuracy can be achieved even with a low throughput volume, without in the case of a high throughput reaching an excessively high flow resistance or obtaining excessively strong measurement effects, which can no longer be resolved. Due to the use of different projection heights, or the additional use of at least one bypass, it is possible to achieve the effect that the flow changes in a plurality of stages from laminar flow to turbulent flow, so that a sudden change in the flow and therefore sudden or hysteretic variations of the relationship between the flow velocity or measurement quantity and the throughput volume can be avoided.

The inner wall of the measuring tube, on which the projections are provided, can have any desired cross-sectional shape. For example, the basic shape of the inner wall may be circular, and the projections may protrude, in particular radially, into the circular flow cross section which is formed. It is, however, also possible for the inner shape to deviate from a circular shape. For example, the inner wall may delimit an oval or polygonal, in particular rectangular flow cross section. The projections may protrude perpendicularly from the inner wall.

The projections may be distributed over the entire inner wall in the circumferential direction, but also only in one or more sections of the circumference. In the case of polygonal flow cross sections which are delimited by a plurality of side walls placed at an angle to one another, just one of the side walls or a plurality of the side walls, in particular two opposite side walls, may include projections. Smooth wall sections without projections make it possible, in particular, to send ultrasound radiation diagonally through the measuring tube without interfering with its propagation by projections.

At least parts of the projections or of the bypass channels may be shaped in such a way that trapezoidal flow cross sections are formed in individual cross subsections or bypass channels. This results in different wall sections inside this cross subsection or bypass, which may lead to a smooth transition between turbulent and laminar flow. With an increasing throughput, increasingly large sections of this cross subsection or bypass are flowed through turbulently.

The projection height of the first projections may be between 1.5 times and 2 times as great as the projection height of the second projections, and/or the projection height of the second projections may be between 0.5 times and 1.1 times as great as the distance between projections which are adjacent in the circumferential direction of the measuring tube. In the scope of the invention, it has been discovered that a high measurement accuracy can be achieved over a large dynamic range of the throughput by using these projection geometries.

The length of the projections or of the bypass channels in the flow direction should be sufficiently large to be able to achieve the flow technology advantages mentioned. It may be sufficient for the length of the first and/or the second projections to be at least 1.5 times, preferably at least 2 times, as great as the distance between two adjacent first or second projections, and in the case of nonparallel wall sections of the projections the shortest distance should be taken into account. The length of the measuring tube should likewise be at least 1.5 times or 2 times as great as this distance. The projections may extend over at least 50%, preferably over at least 70% or 80% of the length of the measuring tube, in particular over the entire length of the measuring tube. The length of the bypass channels in the flow direction may, for example, be between four times and six times as great as their width in the circumferential direction, or perpendicularly to the flow direction.

In at least one section of the measuring tube, a projection width of at least one of the projections may increase in the direction of the fluid outlet. In this way, the fluid in the measuring tube can be accelerated, so that a flow can be further stabilized. In particular, the section in which the projection width increases may extend over at least 60%, 70% or 80% of the length of the measuring tube. The region may, in particular, begin at the end of the measuring tube on the fluid inlet side. The projection width describes the extent of the individual projections in the circumferential direction of the measuring tube.

In a fluid outlet side section of the measuring tube, the side wall of the measuring tube may end at different positions in the circumferential direction at different positions in the flow direction. The section of the measuring tube on the fluid outlet side may, in particular, begin at that position in the flow direction at which the side wall ends in the circumferential direction at the earliest position in the flow direction. Through the use of a stepped end of the measuring tube, the flow cross section at the end of the measuring tube may be increased, which in particular can avoid or at least reduce stagnation, for example due to a reflection element disposed in the flow path.

The side wall may extend further in the direction of the fluid outlet in those regions in the circumferential direction in which the projections are formed than in intermediate regions lying between these regions in the circumferential direction. The flow cross section is therefore widened in the end region of the measuring tube by grooves formed between the projections being deepened. Since, as explained above, with a low flow volume the flow velocity is relatively low in these grooves, the effect of this is that at low flow velocities the earlier ending of the side wall leads to only a minor reduction in the flow velocity, so that the measurement accuracy with a low flow volume can be improved.

In the section on the fluid outlet side, the or a projection width of at least one of the projections may decrease in the direction of the fluid outlet. In this way as well, it is possible to achieve the effect that the flow resistance of the measuring tube overall decreases in particular with high flow volumes, with stagnations at reflection elements for the ultrasound radiation being avoided in particular. If the projection width of the measuring tube were initially to increase in a first section in the direction of the fluid outlet and then decrease in the section on the fluid outlet side in the direction of the fluid outlet, the measuring tube may nevertheless be produced by using an injection-molding method, by assembling two injection-molded body parts in a region in which the section on the fluid outlet side begins. The opposing variations of the projection widths may in this case contribute to the body parts being easy to release from the mold.

The projection height of at least one of the projections may be reduced in a step fashion at that position in the flow direction at which, in an intermediate region of the measuring tube, adjacent the projection in the circumferential direction of the measuring tube, the side wall there ends. If the side wall ends at the same position in intermediate regions between the projections, the stepped reduction of all of the projections may take place in a plane in which the section of the measuring tube on the fluid outlet side begins. A stepped reduction may, in particular, be advantageous when two body parts of the measuring tube are assembled in this plane, since a defined transition between the body parts can therefore be achieved.

The or a projection width of the projections may be mutually different for at least two of the projections, and/or a distance between the projections in the circumferential direction of the measuring tube may be mutually different for at least two pairs of the projections adjacent one another in the circumferential direction. In this way, a rotational symmetry of the measuring tube, and therefore also of the flow conveyed by the measuring tube, can be reduced, which may contribute to stabilization of the flow since a sudden change of the flow between flow profiles which are equivalent because of the rotational symmetry can be avoided.

The projection width of the projections can be between 0.7 mm and 2.0 mm. This width may be the width of the projection at the base of the projection, i.e. lying radially outwards. The width of the projections may be reduced slightly in the direction of the middle of the measuring tube. In this way, on one hand, the continuity of the transition from laminar to turbulent flow can be improved, and on the other hand the releasability from the mold in the case of injection molding of the measuring tube can be improved.

A projection length of the projections in the flow direction may be greater than the projection height, and/or the or a projection width of the projections may be less than the projection height. In other words, projections which are narrow and extended in the flow direction are preferably used. The projections may, in particular, extend over the entire length of the measuring tube.

In the case in which the flow channel includes at least one bypass, the bypass may be formed at least in sections by a plurality of separate bypass channels. Preferably, the flow cross section of each of the bypass channels is less than the flow cross section of the measuring tube. In this way, it is possible to achieve the effect that, with a relatively low flow volume through the flow channel, when the flow in the bypass channels is laminar, the flow velocity in the bypass channels is less than in the measuring tube, in particular than in the measurement region of the measuring tube. At the same time, however, in a similar way as explained above for the edge regions, the flow in the bypass channels only changes to turbulent flow with a relatively high flow volume, so that a larger proportion of the fluid volume conveyed through the flow channel is conveyed past the measuring tube, and therefore the measurement section of the measuring tube, through the bypass channels. The flow velocity in the measuring tube, or in the measurement region, therefore increases because of the use of the bypass channels less than linearly with an increase in the fluid volume delivered. In this way, the sensitivity of the measurement with a low flow volume can be improved, while an excessively high flow resistance or saturation of the measurement with a high flow volume is avoided. The flow cross section of the bypass channel may be less than the flow cross section of the measuring tube, in particular than the flow cross section of the measuring tube at its narrowest position, by at least a factor of 3, a factor of 5 or a factor of 10.

The bypass channels may preferably be shorter than the measuring tube, with the bypass channels opening on the fluid inlet side and/or fluid outlet side into a common bypass body that couples the bypass channels fluidically to the flow channel. The bypass channels may, in particular, extend parallel to the measuring tube and be shorter than it in the flow direction. The sum of the length of the bypass channels and of the bypass volume, or of the bypass volumes, may in this case correspond to the length of the measuring tube, that is to say the entire bypass may be routed parallel to the measuring tube. In particular, the bypass volume and/or the bypass channels may be disposed in an intermediate space between the measuring tube and an outer tube, with the outer tube forming in particular the outer wall of the flow channel at least in sections. Use of relatively short, relatively thin bypass channels makes it possible for them to have significantly lower flow resistance in the case of turbulent flow than in the case of laminar flow.

The bypass channels may be shorter than the measuring tube in the flow direction by at least a factor of 2, in particular by at least a factor of 5 or 10. In this way, the advantages mentioned above can be achieved particularly well.

The plurality of bypass channels may be distributed around the measuring tube in the circumferential direction of the measuring tube. In particular, the bypass channels may be distributed uniformly along the circumference and/or be identically shaped. A fluid flowing in may therefore be distributed approximately uniformly over the bypass channels.

The bypass channels may, as already explained above, be disposed between an outer tube, which forms the measurement channel in sections, and the measuring tube. This allows for a simple and compact structure of the ultrasonic meter.

The bypass channels may be formed by a bypass device disposed between the measuring tube and the outer tube or by this device together with an outer wall of the measuring tube and/or an inner wall of the outer tube. The bypass device may in particular be annular, with the measuring tube being fed through the bypass device. The bypass device may include a plurality of interruptions in the flow direction, which form the bypass channels. As an alternative or in addition, the bypass device may include radially external projections which bear on the outer tube, and/or radially internal projections which bear on the measuring tube, in order to form respective bypass channels together with this tube or these tubes. The bypass device can also be configured so as to be integral to the measuring tube. For example, an outer wall of a measuring tube can be thickened in an outward manner in one portion, wherein the thickening has axial breakthroughs which form the bypass channels. Bypass channels can also be formed in such a way that projections which protrude, in particular protrude in a radial manner, on the outer wall of the measuring tube and which extend in particular up to an inner wall of an outer tube so as to form the bypass channels are present.

The outer tube may fully receive the measuring tube, with a midline of the measuring tube, extending in the flow direction, being offset relative to a midline of the outer tube, extending in the flow direction. An asymmetrical configuration of the measuring tube in the outer tube, and therefore particularly in the flow cross section of the flow channel, may break a rotational symmetry of the flow profile and therefore contribute to the flow stabilization. Furthermore, by this configuration the distance between the outer wall of the measuring tube and the inner wall of the outer tube may vary, which may for example be used to vary the sizes of bypass channels in the radial direction. Such an offset configuration of the measuring tube with respect to the outer tube may, for example, be produced by using a bypass device, or a bypass ring, the recess of which that receives the measuring tube being offset relative to the middle of this bypass device, or of the bypass ring.

In the ultrasonic meter, at least two of the bypass channels can have mutually different lengths in the flow direction and/or different cross-sectional shapes. As an alternative or in addition, for at least one of the bypass channels, two side walls delimiting this bypass channel in the circumferential direction of the measuring tube can end at different positions in the flow direction. Due to the aforementioned differences between the bypass channels, in particular, rotational symmetries of the flow profile can be reduced and the flow can therefore be stabilized. The delimiting of a bypass channel by walls of different lengths may, because of the Coanda effect, lead to a flow section emerging from this bypass channel being deflected relative to the flow direction, so that flow stabilization can likewise be achieved. Different lengths and/or shapes of bypass channels may furthermore lead to a change from laminar to turbulent flow in the various bypass channels taking place with a different flow volume. This may serve to achieve a multistage transition of the flow behavior, so that sudden flow changes and/or hysteresis effects can be avoided.

Other features which are considered as characteristic for the invention are set forth in the appended claims.

Although the invention is illustrated and described herein as embodied in an ultrasonic meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
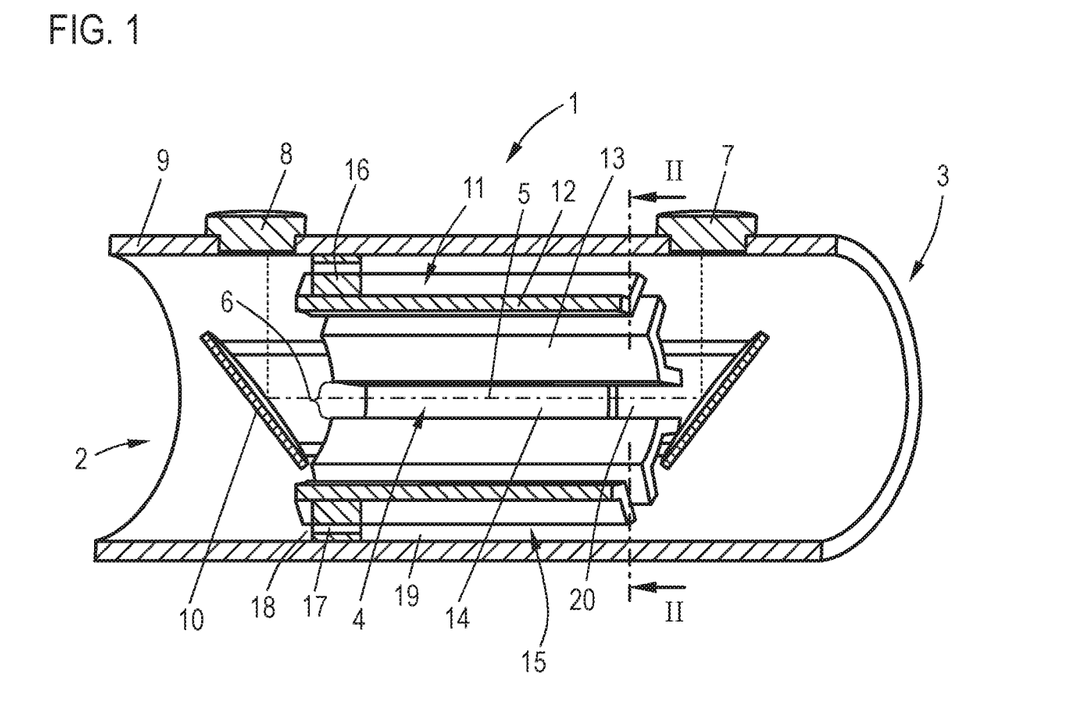
FIG. 1 is a diagrammatic, longitudinal-sectional view of an exemplary embodiment of an ultrasonic meter according to the invention.

Referring now to the figures of the drawings in detail and first, particularly, to FIG. 1 thereof, there is seen an ultrasonic meter 1 for recording a flow rate of a fluid. The ultrasonic meter 1 includes a fluid inlet 2 and a fluid outlet 3, which are respectively used to deliver fluid into the ultrasonic meter 1 and discharge it therefrom. A flow channel 4 connects the fluid inlet 2 to the fluid outlet 3.

In order to measure the flow rate, a flow velocity of the fluid is determined by emitting an ultrasound beam 5 substantially parallel to the flow direction through a measurement region 6 and evaluating a time of flight and/or a frequency shift of the ultrasound signal. This procedure is widely known in the prior art and need not be explained in more detail. Ultrasound transducers 7, 8 for respectively providing and receiving the ultrasound signal are disposed on a side wall of an outer tube 9, which forms the flow channel 4 at least in sections. The emission and the reception of the ultrasound signals by the ultrasound transducers 7, 8 may be carried out approximately orthogonally to the flow direction. Reflection elements 10 are used in order to guide the ultrasound beam substantially parallel to the flow direction in the measurement region 6.

The measured time of flight differences depend on the flow velocity of the fluid in the measurement region 6. Since a measurement error is typically composed of an absolute and a relative error, the measurement accuracy typically increases with an increasing flow velocity in the measurement region 6. In order to achieve a high measurement accuracy even with low flow rates, it is known to insert a measuring tube 11 into the flow channel 4, which reduces the flow cross section of the flow channel 4. If a high measurement accuracy is intended to be achieved for a low flow volume, the flow cross section in the measurement region 6 should be as small as possible. At the same time, however, a small flow cross section in the measurement region 6 leads to the ultrasonic meter having a high flow resistance, which is typically disadvantageous, and to large flow rates under certain circumstances not being correctly recordable.

In order to achieve a high measurement accuracy with low flow rates as well as a relatively low flow resistance, and sufficiently accurate measurability with a high flow volume, in the exemplary embodiment shown a plurality of flow paths or sections of the flow cross section are provided for the fluid. The effect achieved by a change of the flow in the individual flow paths or sections from laminar flow to turbulent flow with a different flow volume, is that the flow velocity in the measurement region 6 varies not linearly with the flow volume but more slowly.

To this end, on one hand, a plurality of projections 13 are provided on a side wall 12 of the measuring tube 11, so that grooves 14 are formed between these projections 13. In the grooves 14, the distance of the fluid flowing through them from the adjacent side wall 12 is relatively small, so that in the case of a laminar flow there is a lower flow velocity as compared with the measurement region 6. At the same time, however, the flow in the grooves 14 does not change to turbulent flow until a relatively large flow volume, so that with high throughputs the proportion of the fluid which is conveyed through the grooves 14 increases in comparison with the proportion of the fluid which is conveyed through the measurement region 6. The effect of this is that the flow velocity in the measurement region 6 increases less strongly with an increasing flow volume than would be the case with a round tube cross section or the line.

Projections 13 which are relatively wide in the circumferential direction of the measuring tube 11 are shown in the exemplary embodiment. This is used in particular for a clearer representation of the principle. In order to reduce the flow resistance with a large flow volume it may be advantageous to use projections 13 which are relatively narrow in the circumferential direction of the measuring tube 11, as will be further explained below with reference to other exemplary embodiments.

If, as in the exemplary embodiment shown in FIG. 1, projections 13 are used which all have the same projection height, the effect of this may be that a change from laminar to turbulent flow takes place substantially simultaneously in all of the grooves 14. This may, depending on the specific structure of the ultrasonic meter 1, have the effect that the relationship between the measurement quantity, i.e. for example between a time-of-flight difference, and the flow volume has a jump or is even hysteretic in this region, which makes a reliable measurement in this region difficult or even impossible. In order to be able to avoid this, as will be explained in more detail below, projections 13 with mutually different projection heights are used. In the exemplary embodiment shown, however, an additional fluid path is instead provided through a bypass 15. The bypass 15 can divert a part of the fluid conveyed through the flow channel 4 past the measuring tube 11.

Figure 2:
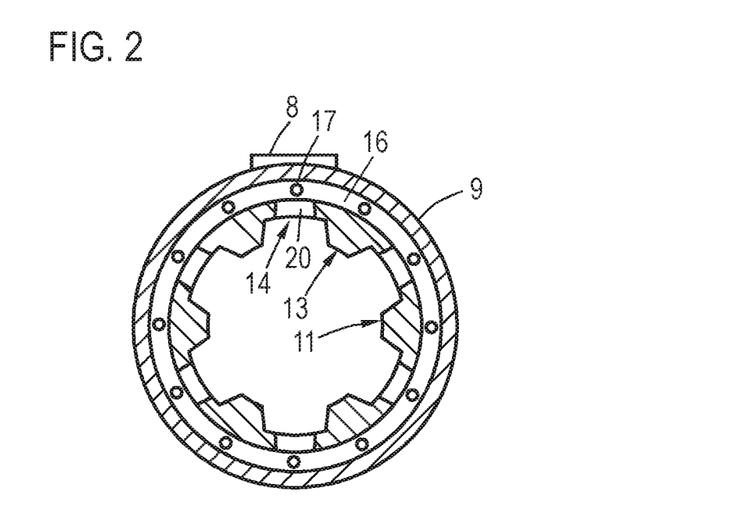
FIG. 2 is a cross-sectional view of the ultrasonic meter taken along a line II-II of FIG. 1, in the direction of the arrows.

In order to form this bypass 15, an annular bypass device 16 is used, which separates the measuring tube 11 from the outer tube 9. The configuration of the bypass device 16 may particularly be seen in FIG. 2, which shows a section of the ultrasonic meter 1 along the line II-II in FIG. 1. The viewing direction in FIG. 2 is towards the fluid inlet 2, but the reflection element 10 and its mount are not represented for reasons of clarity. A plurality of bypass channels 17 disposed around the measuring tube 11 in the circumferential direction are formed by interruptions of the bypass device 16 in the flow direction. The channels 17, together with bypass volumes 18, 19, which couple the bypass channels 17 to the flow channel 4, form the bypass 15. The individual bypass channels 17 are significantly shorter than the measuring tube 11 and have a smaller flow cross section in comparison with the measurement region 6, or the grooves 14, i.e. a smaller area perpendicularly to the flow direction.

As long as the fluid flows in a laminar fashion both in the bypass channels 17 and in the measuring tube 11, the average flow velocity in the bypass channels 17 is therefore significantly less than in the measuring tube, since the fluid has a very low wall distance in the bypass channels 17. However, a change to a turbulent flow in the bypass channels 17, in particular because of their short length, leads to the flow velocity there increasing more strongly in comparison with the flow velocity in the measuring tube when there is an increase in the volume flow, so that with greater throughputs a greater proportion of the fluid is conveyed through the bypass channels 17 than with low throughputs. By way of example, with a very low flow volume the flow may be laminar both in the bypass channels 17 and in the entire measuring tube 11. Even with relatively low flow rates, turbulent flows are formed in the measurement region 6 because of the large wall distances of the fluid. With an increasing flow volume, the flow in the grooves 14 then initially changes to turbulent flow, so that a greater proportion of the fluid can be diverted past the measurement region 6. When there is a further increase in the flow volume, the flow in the bypass channels 17 subsequently changes to turbulent flow. Due to this multistage flow change, jumps or hysteresis in the relationship between the flow velocity, or the measurement quantity, and the flow volume are reduced or entirely suppressed.

By using the projections 13, the flow cross section in the measuring tube 11 is reduced at least slightly. With high flow volumes, this could have the effect that fluid emerging from the measuring tube 11 stagnates at a reflection element 10, which may lead to sudden flow changes or other perturbations of the measurement. In order to avoid this, it may be advantageous to widen the flow cross section in good time before the reflector 10, which may for example be achieved by the side wall 12 of the measuring tube 11 being interrupted in the region of the grooves 14, i.e. in an intermediate region 20 between the projections 13.

Figure 3:
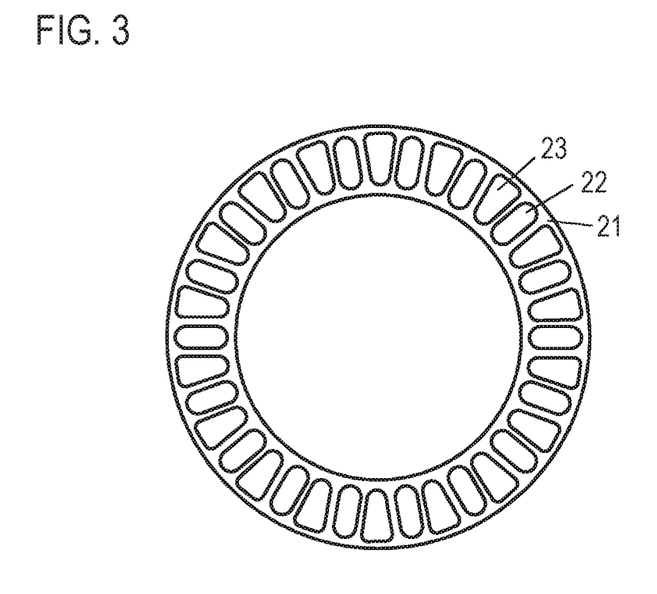
FIGS. 3 to 6 are elevational and perspective views of bypass devices which may be used in alternative exemplary embodiments of the ultrasonic meter according to the invention, instead of the bypass device shown in FIGS. 1 and 2.

The bypass device 16 shown in FIGS. 1 and 2 includes bypass channels 17 which are substantially identically shaped and are disposed uniformly along the circumference of the measuring tube 11. In order to reduce a rotational symmetry and/or in order to smooth a curve which describes the relationship between the flow volume and the flow velocity in the measurement region 6, it may however be advantageous to use mutually different bypass channels. An example of this is represented in FIG. 3. A bypass device 21 in this case includes two different types of bypass channels 22, 23, which are alternately disposed circumferentially around the measuring tube.

Figure 4:
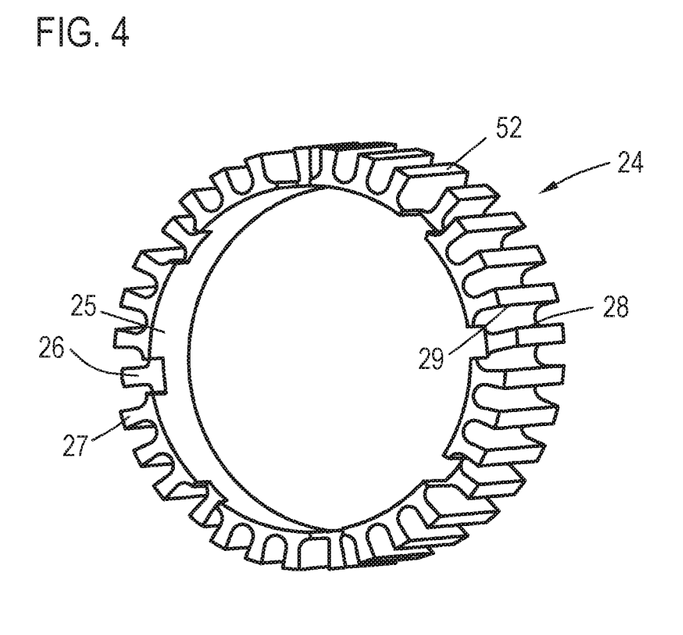

In the exemplary embodiments described so far, the bypass channels 17, 22, 23 are each fully enclosed circumferentially by the bypass device 16, 21. In order to produce a more compact ultrasonic meter, or to simplify the production of the bypass device, it may be advantageous to delimit the bypass channels only partially by the bypass device and to provide the remaining side walls by the outer tube 9 or the measuring tube 11. An example of this is represented in FIG. 4. A bypass device 24 bears with an inner surface 25 on the measuring tube 11. Projections 26, 27 extend radially outwards from this surface in order to bear with their outer surface 52 on the outer tube 9.

The bypass device 24 furthermore uses projections 26, 27 which extend to different distances in the flow direction. The effect achieved by this is that, for at least some of the bypass channels, two side walls 28, 29 delimiting the respective bypass channel in the circumferential direction of the measuring tube 11 end at different positions in the flow direction. Due to the Coanda effect, the fluid emerging from the bypass channel is deflected as a result of this, which can contribute to breaking a rotational symmetry and therefore to stabilising the flow.

Figure 5:
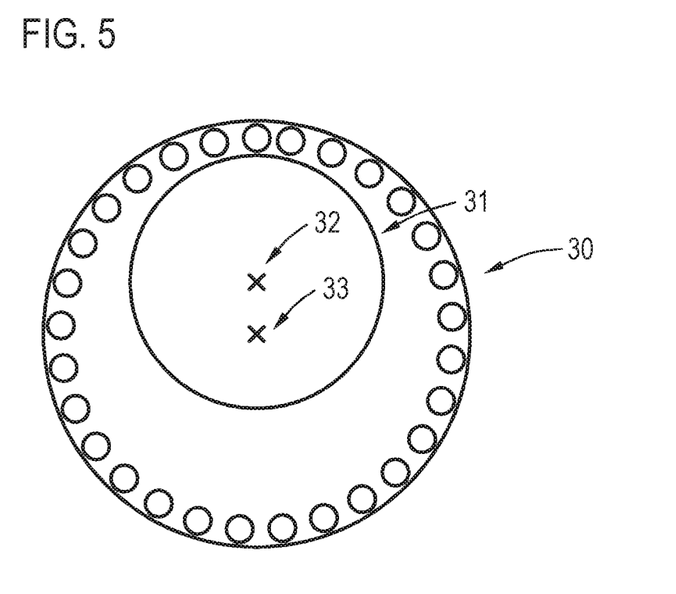

FIG. 5 shows a further bypass device 30, which differs from the bypass device 16 used in FIGS. 1 and 2 in that a recess 31 for receiving the measuring tube 11 is disposed offset relative to the middle of the bypass device 30. The effect of this is that a straight line 32 of the measuring tube, extending in the flow direction, is offset relative to a midline 33 of the outer tube 9, extending in the flow direction. This can lead to the rotational symmetry of a flow profile conveyed through the measuring device 1 being broken, so that a flow behavior can be stabilized.

Figure 6:
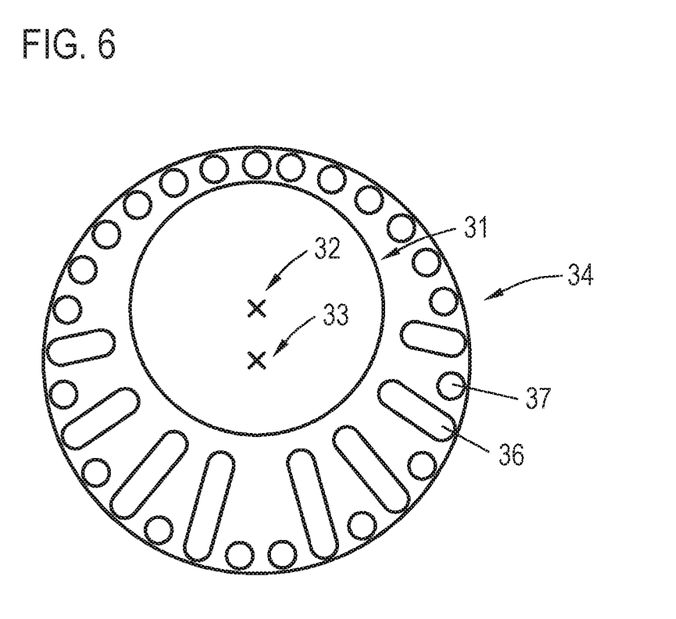

In order to further reduce the symmetry of the flow profile, and/or in order to further reduce a flow resistance of the ultrasonic meter 1, radial extents of bypass channels 36 may be varied, as is represented for a bypass device 34 in FIG. 6. In principle, it would additionally be possible to carry out the variation of the extent for all bypass channels. In the exemplary embodiment shown, however, bypass channels 37 with circumferentially constant profiles and bypass channels 36 having a radial extent on which the position in the circumferential direction of the measuring tube 11 depends are alternately used.

Figure 7:
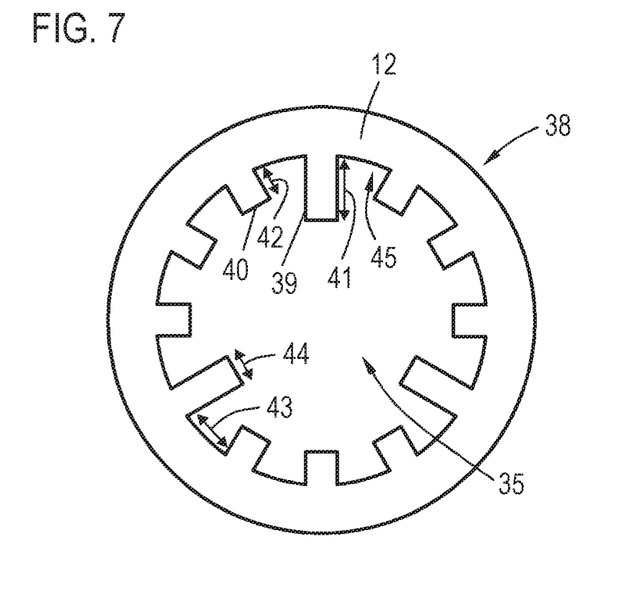
FIG. 7 is an elevational view of a measuring tube of an alternative exemplary embodiment of an ultrasonic meter according to the invention.

As already explained in the introduction, as an alternative or in addition to using a bypass 15 for conveying a part of the fluid volume around the measuring tube 11, a measuring tube may be used which includes projections with different heights. By way of example, FIG. 7 represents a measuring tube 38 which includes three first projections 39 and nine second projections 40. The first projections 39 have a projection height 41, i.e. a height by which they protrude beyond the side wall 25, which is from 1.5 times to 2 times as great as a projection height 42 of the second projections 40. The projection height of the second projections may 40 be from 0.5 times to 1.1 times as great as a distance 43 between adjacent projections 39, 40. A width 44 of the projections 39, 40 may in particular be narrower than the distance 43 between the projections 39, 40, in order to minimize the flow resistance of the measuring tube 38 with high flow rates.

Figure 8:
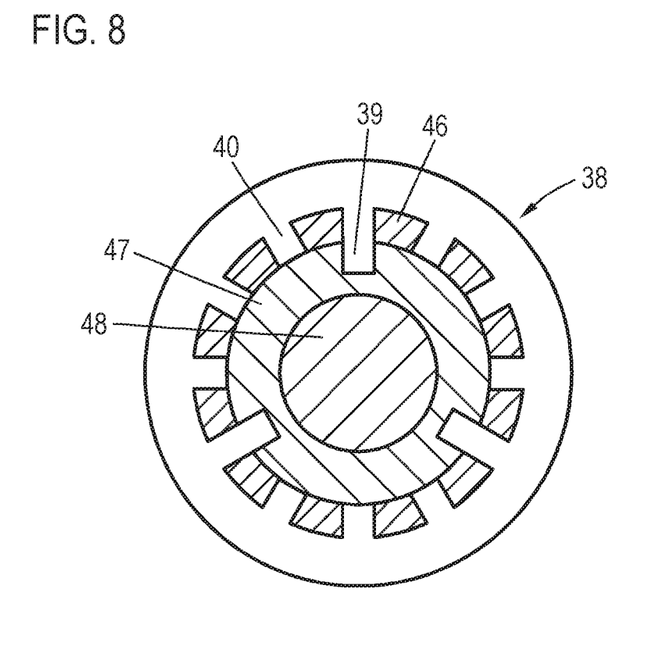
FIG. 8 is a sectional view showing various sections of the flow profile of the measuring tube shown in FIG. 7.

The flow behavior in the measuring tube 38, which depends on the flow volume, will be explained below with reference to FIG. 8. A flow cross section 35 of the measuring tube 38 may be subdivided for an approximate description of the flow behavior into an edge region 46, a central region 47 and a core region 38, the ultrasound beam 5 represented in FIG. 1 preferably being guided through the core region 48, i.e. the measurement region 6 lies inside the core region 48.

If a relatively low flow volume is conveyed through the measuring tube 38, the flow in the regions 46, 47 and 48 is in each case laminar. Since the fluid in the core region 48 is separated furthest from an inner wall 45, it flows there most rapidly, whereas it flows most slowly in the edge region 46 because of the small wall distance. Even with a relatively low throughput, the flow in the core region 48 may be turbulent because of the large wall distances.

If the flow volume is increased further, initially the flow in the central region 47 changes to turbulent flow, whereby the proportion of the entire volume flow which is transported in the central region 47 increases. The flow velocity in the core region 48 therefore increases more slowly because of the flow change in the central region 47. The flow in the edge regions 46 initially remains laminar.

In the event of a further increase in the volume flow, the flow in the edge regions 46 also changes to turbulent flow. Compared with low throughputs, both the edge regions 46 and the central region 47 therefore also contribute more strongly to the fluid transport, so that an increase in the flow velocity in the core region 48 with the volume flow is also reduced by this flow change.

Figure 9:
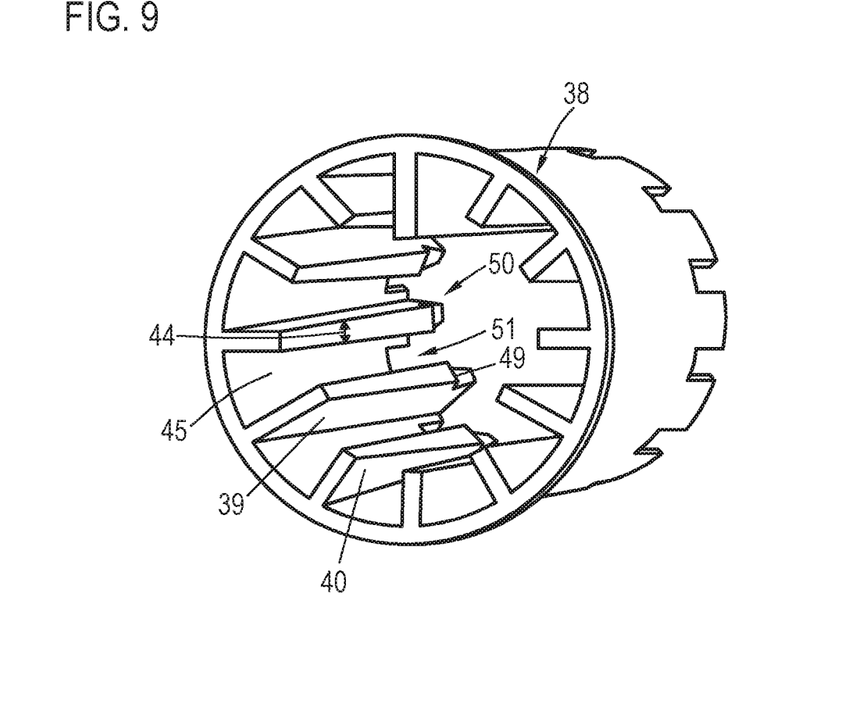
FIG. 9 is a perspective view of the measuring tube represented in FIG. 7.

Further details regarding the structure of the measuring tube 38 are represented in FIG. 9, which shows a three-dimensional view of the measuring tube 38. In this representation, it can be seen that the projection width 44 both of the first projections 39 and of the second projections 40 initially increases in the direction of the fluid outlet. Shortly before the end of the measuring tube 38 on the fluid outlet side, a section 50 of the measuring tube 38 on the fluid outlet side begins, in which the projection width 44 of the projections 39, 40 decreases again. In the transition of these regions, the respective projection height 41, 42 is reduced at an edge 49. In the section 50 on the fluid outlet side, the inner wall 45 is furthermore interrupted in a respective intermediate region 51 adjacent the projections 39, 40, in order to counteract fluid stagnation, for example at the reflection element shown in FIG. 1.

Figure 10:
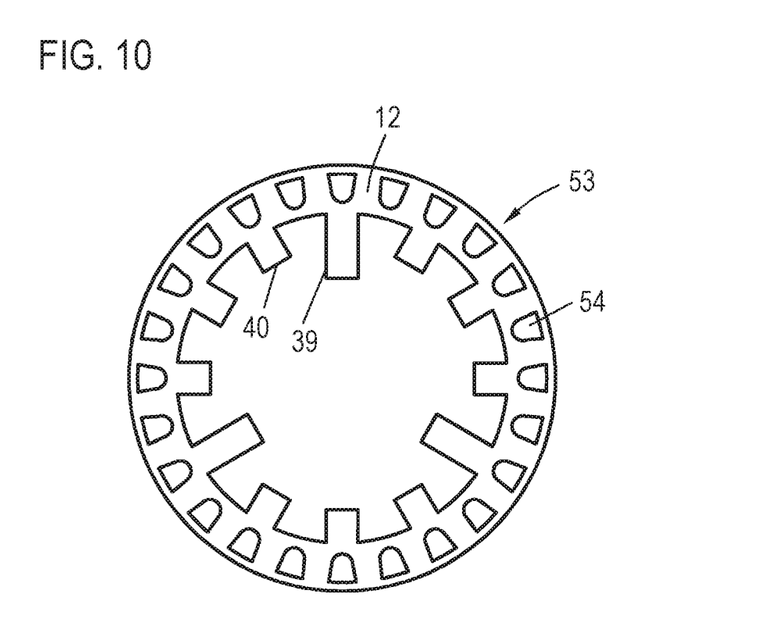
FIGS. 10 to 12 are elevational and sectional views of measuring tubes of further exemplary embodiments of an ultrasonic meter according to the invention.

FIG. 10 shows an exemplary embodiment of a measuring tube 53 which, like the measuring tube 38 already represented in FIG. 7, includes projections 39, 40 with a mutually different projection height. In addition, however, in the measuring tube 53 bypass channels 54 are provided in the outer wall of the measuring tube. Due to the additional use of bypass channels, the dynamic range of an ultrasonic meter which uses this measuring tube 53 can be increased further. In order to simplify the production of the ultrasonic meter, the bypass channels 54 are formed directly through the side wall 12 of the measuring tube 53. As an alternative, however, a separate bypass device would also be usable, such as was explained with reference to FIGS. 1 to 6. On the other hand, instead of the separate bypass devices, it is also respectively possible to use a measuring tube which itself forms the bypass channels.

The bypass channels 54 may, as explained above, be significantly shorter than the measuring tube. In order to make this possible with the one-piece configuration shown for the measuring tube and the bypass device, the side wall 12 of the measuring tube 53 may have a larger wall thickness in the region in which the bypass channels 54 are intended to be formed, with the bypass channels 54 passing axially through this additional wall thickness.

Figure 11:
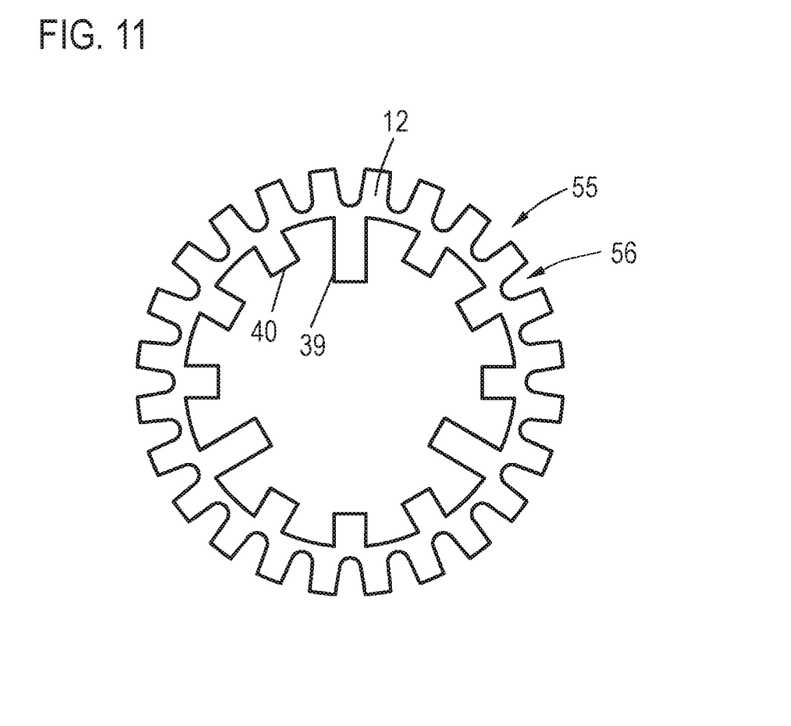

The bypass channels may, as is diagrammatically represented in FIG. 11 for a measuring tube 55, also be formed by projections, which preferably extend as far as the inner wall represented in FIG. 1 of the outer tube 9, being provided on an outer side of the side wall 12 of the measuring tube 55.

The exemplary embodiments so far have shown measuring tubes 11, 38, 53, 55 which, apart from the projections, have a substantially round flow cross section, with the projections being distributed substantially uniformly in the circumferential direction. It is, however, as represented by way of example in FIG. 12, also possible for a rectangular measuring tube 57 or any other desired cross-sectional shape to be used. The projections 39, 40 may in this case be disposed only on some of a plurality of side walls 58, 59 placed at an angle to one another, or only in parts of the surface of the side wall in the circumferential direction.

Figure 12:
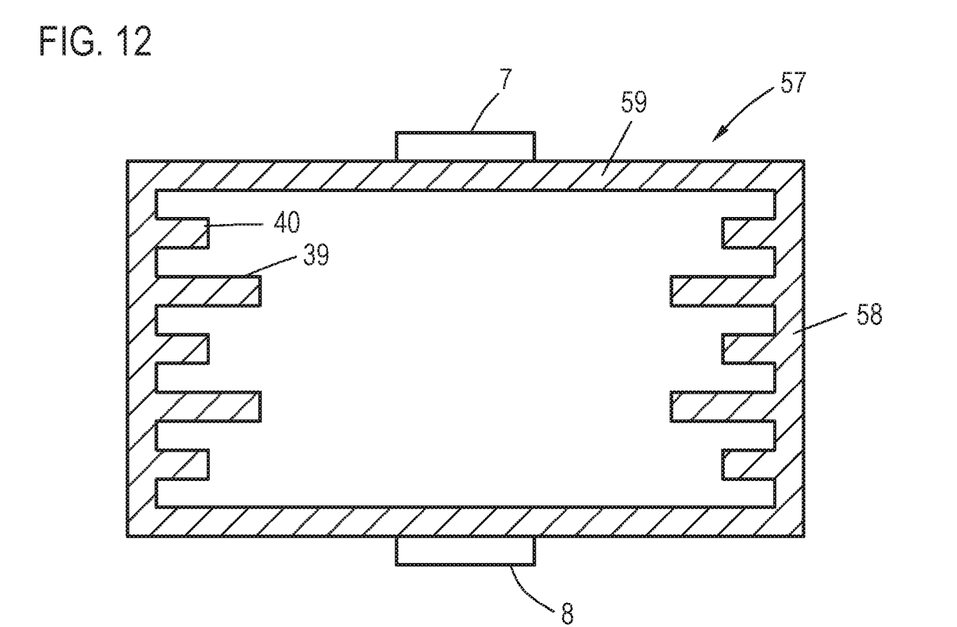

The measuring tube 57 shown allows, for example, diagonal irradiation of the measuring tube when the ultrasound transducers 7, 8 are disposed on the flat side walls 59 which do not include projections. This avoids a measurement in a central measurement region being interfered with by the projections 39, 40, although the above-described increased dynamic range of the measurement can nevertheless be achieved.

The following is a summary list of reference numerals and the corresponding structure used in the above description of the invention:

1 ultrasonic meter
2 fluid inlet
3 fluid outlet
4 flow channel
5 ultrasound beam
6 measurement region
7 ultrasound transducer
8 ultrasound transducer
9 outer tube
10 reflection element
11 measuring tube
12 side wall
13 projection
14 groove
15 bypass
16 bypass device
17 bypass channel
18 bypass volume
19 bypass volume
20 intermediate region
21 bypass device
22 bypass channel
23 bypass channel
24 bypass device
25 inner surface
26 projection
27 projection
28 side wall
29 side wall
30 bypass device
31 recess
32 midline
33 midline
34 bypass device
35 flow cross section
36 bypass channel
37 bypass channel
38 measuring tube
39 projection
40 projection
41 projection height
42 projection height
43 distance
44 projection width
45 inner wall
46 edge region
47 central region
48 core region
49 edge
50 section
51 intermediate region
52 outer surface
53 measuring tube
54 bypass channel
55 measuring tube
56 bypass channel 57 measuring tube
58 side wall
59 side wall

The invention claimed is:

1. An ultrasonic meter for recording a flow rate of a fluid, the ultrasonic meter comprising:
    a fluid inlet;
    a fluid outlet; and
    a flow channel connecting said fluid inlet to said fluid outlet, said flow channel including a measuring tube extending in a straight line in a flow direction;
    said measuring tube including a length, a flow cross section, a side wall having an inner wall and a plurality of projections formed on said inner wall;
    said projections delimiting said flow cross section, said projections extending over at least a section of said length of said measuring tube in said flow direction, said projections extending with a predetermined projection height at an angle to said side wall, at least two of said projections having mutually different projection heights; and
    said projections including a plurality of first projections having a projection height being greater than or equal to a limiting projection height, and a plurality of second projections having a projection height being less than said limiting projection height, at least one or at least two of said second projections being formed in a circumferential direction of said measuring tube between two of said first projections formed on said inner wall.

2. The ultrasonic meter according to claim 1, wherein said projections extend perpendicularly to said side wall.

3. The ultrasonic meter according to claim 1, which further comprises at least one of:
    said projection height of said first projections being between 1.5 times and 2 times as great as said projection height of said second projections, or
    said projection height of said second projections being between 0.5 times and 1.1 times as great as a distance between said projections being mutually adjacent in said circumferential direction of said measuring tube.

4. The ultrasonic meter according to claim 1, wherein a projection width of at least one of said projections increases in a direction of said fluid outlet in at least one section of said measuring tube.

5. The ultrasonic meter according to claim 4, wherein said measuring tube has a fluid outlet side section at which said side wall of said measuring tube ends at different positions in said circumferential direction at different locations along said flow direction.

6. The ultrasonic meter according to claim 5, wherein said side wall has regions in said circumferential direction in which said projections are formed and intermediate regions disposed between said regions in said circumferential direction, and said side wall extends further in said direction of said fluid outlet in said regions than said intermediate regions.

7. The ultrasonic meter according to claim 5, wherein said projection width of at least one of said projections in said fluid outlet side section decreases in said direction of said fluid outlet.

8. The ultrasonic meter according to claim 4, wherein said projection height of at least one of said projections is reduced in a step fashion in said flow direction at a position at which said side wall ends in an intermediate region of said measuring tube adjacent said at least one projection in said circumferential direction of said measuring tube.

9. The ultrasonic meter according to claim 1, which further comprises at least one of:
    mutually different projection widths of at least two of said projections, or
    mutually different distances between said projections in a circumferential direction of said measuring tube for at least two pairs of said projections being adjacent one another in said circumferential direction.

10. The ultrasonic meter according to claim 1, wherein at least one of said projections has a projection width of between 0.7 mm and 2.0 mm.

11. The ultrasonic meter according to claim 1, wherein said projections have at least one of:
    a projection length in said flow direction being greater than said projection height, or
    a projection width being less than said projection height.

12. The ultrasonic meter according to claim 1, wherein each of said bypass channels has a flow cross section being less than said cross section of said measuring tube.

13. The ultrasonic meter according to claim 1, wherein said bypass channels are shorter than said measuring tube, and said bypass channels open on at least one of a fluid inlet side or a fluid outlet side into a common bypass volume coupling said bypass channels fluidically to said flow channel.

14. The ultrasonic meter according to claim 13, wherein said bypass channels are shorter than said measuring tube in said flow direction by at least a factor of between 2 and 10.

15. The ultrasonic meter according to claim 1, wherein said plurality of bypass channels are distributed around said measuring tube in a circumferential direction of said measuring tube.

16. An ultrasonic meter for recording a flow rate of a fluid, the ultrasonic meter comprising:
    a fluid inlet;
    a fluid outlet; and
    a flow channel connecting said fluid inlet to said fluid outlet, said flow channel including a measuring tube extending in a straight line in a flow direction;
    said measuring tube including a length, a flow cross section, a side wall having an inner wall and a plurality of projections formed on said inner wall;
    said projections delimiting said flow cross section, said projections extending over at least a section of said length of said measuring tube in said flow direction, and said projections extending with a predetermined projection height at an angle to said side wall;
    at least one bypass of said flow channel for diverting a part of a fluid flowing through said flow channel past said measuring tube, said bypass being formed at least in sections by a plurality of separate bypass channels;
    an outer tube forming said flow channel in sections, said plurality of bypass channels being disposed between said outer tube and said measuring tube; and
    said outer tube fully receiving said measuring tube, said outer tube and said measuring tube having midlines extending in said flow direction, and said midline of said measuring tube being offset relative to said midline of said outer tube.

17. The ultrasonic meter according to claim 16, which further comprises a bypass device disposed between said measuring tube and said outer tube, said bypass channels being formed by said bypass device together with at least one of an outer wall of said measuring tube or an inner wall of said outer tube.

18. An ultrasonic meter for recording a flow rate of a fluid, the ultrasonic meter comprising:

a fluid inlet;

a fluid outlet; and a flow channel connecting said fluid inlet to said fluid outlet, said flow channel including a measuring tube extending in a straight line in a flow direction;

said measuring tube including a length, a flow cross section, a side wall having an inner wall and a plurality of projections formed on said inner wall;

said projections delimiting said flow cross section, said projections extending over at least a section of said length of said measuring tube in said flow direction, and said projections extending with a predetermined projection height at an angle to said side wall; and at least one bypass of said flow channel for diverting a part of a fluid flowing through said flow channel past said measuring tube, said bypass being formed at least in sections by a plurality of separate bypass channels;

at least two of said bypass channels having mutually different lengths in said flow direction, or at least two of said bypass channels having different cross-sectional shapes, or at least one of said bypass channels having two side walls delimiting said bypass channel in a circumferential direction of said measuring tube ending at different positions in said flow direction.

\* \* \* \* \*